United States Patent
Srinivasan et al.

(10) Patent No.: US 12,423,201 B1
(45) Date of Patent: Sep. 23, 2025

(54) MACHINE LEARNING MODEL TRAINING TO ASSIST IN SYSTEM DEBUG

(71) Applicant: INTERNATIONAL BUSINESS MACHINES CORPORATION, Armonk, NY (US)

(72) Inventors: Uma Srinivasan, Poughkeepsie, NY (US); Akil Khamisi Sutton, Poughkeepsie, NY (US); Egduard Ramon Jauregui, Aurora, CO (US); Lisander Lopez, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 18/607,627

(22) Filed: Mar. 18, 2024

(51) Int. Cl.
| | |
|---|---|
| *G06F 11/00* | (2006.01) |
| *G06F 11/07* | (2006.01) |
| *G06F 11/22* | (2006.01) |
| *G06F 11/26* | (2006.01) |

(52) U.S. Cl.
CPC ...... *G06F 11/2263* (2013.01); *G06F 11/0766* (2013.01); *G06F 11/261* (2013.01)

(58) Field of Classification Search
CPC .............. G06F 11/2263; G06F 11/0766; G06F 11/261
See application file for complete search history.

(56) References Cited

U.S. PATENT DOCUMENTS

| | | | |
|---|---|---|---|
| 7,587,639 | B2 | 9/2009 | Marisetty et al. |
| 8,645,797 | B2 | 2/2014 | Yigzaw et al. |
| 8,650,447 | B1 | 2/2014 | Wortman et al. |
| 8,873,421 | B2 | 10/2014 | Schulz et al. |
| 10,733,077 | B2 | 8/2020 | Menon et al. |
| 11,232,016 | B1 | 1/2022 | Huynh et al. |

(Continued)

OTHER PUBLICATIONS

Lopez, Carmen Torres et al., "Multiverse Debugging: Non-Deterministic Debugging for Non-Deterministic Programs." ECOOP 2019, p. 27:1 to 27:30.

(Continued)

*Primary Examiner* — Jason B Bryan
(74) *Attorney, Agent, or Firm* — Edward Wixted, Esq.; Kevin P. Radigan, Esq.; Heslin Rothenberg Farley & Mesiti P.C.

(57) ABSTRACT

A process to train a machine learning model to predict fault location in a system includes generating a data set for training the machine learning model. The generating includes injecting, at a selected location of the system, a test fault into a simulation of the system using a workload, and recording a respective error syndrome generated by the simulation. Further, the generating includes repeating the injecting, at other selected location(s) of the system, of other test fault(s) into the simulation of the system, and the recording of respective, generated error syndromes. In addition, the process includes training, using the data set, the machine learning model, and providing the trained machine learning model for use in debugging the system, where the debugging includes predicting, using the trained machine learning model, a fault location within the system based on an error syndrome generated by the system due to the fault.

20 Claims, 18 Drawing Sheets

(56) References Cited

U.S. PATENT DOCUMENTS

| | | | |
|---|---|---|---|
| 2007/0174679 A1 | 7/2007 | Chelstrom et al. | |
| 2008/0215925 A1* | 9/2008 | Degenaro | G06F 11/263 |
| | | | 714/41 |
| 2021/0089418 A1 | 3/2021 | Das Sharma | |
| 2022/0129732 A1 | 4/2022 | Chakrabarty et al. | |
| 2022/0197780 A1 | 6/2022 | Peck et al. | |
| 2023/0034587 A1 | 2/2023 | Ranka et al. | |
| 2023/0214311 A1 | 7/2023 | Bharti et al. | |
| 2023/0229978 A1 | 7/2023 | Luk et al. | |
| 2025/0217263 A1* | 7/2025 | Mokkapati | G06F 11/3604 |

OTHER PUBLICATIONS

Barboza, Erick Carvajal et al., "Machine Learning for Microprocessor Performance Bug Localization." Mar. 2023, pp. 1-12.

Khanfir, Ahmed et al., "IBIR: Bug-report-driven Fault Injection." ACM Transactions on Software Engineering and Methodology, vol. 32, No. 2, Article 33. Mar. 2023, pp. 33:1-33:31.

Schiffel, Ute et al., "Slice Your Bug: Debugging Error Detection Mechanisms Using Error Injection Slicing". Research Gate, May 2010, 11 pages.

Ziad, Mohamed Tared IBN, et al., "cuCatch: A Debugging Tool for Efficiently Catching Memory Safety Violations in CUDA Applications". Proc. ACM Program Lang., vol. 7, No. PLDI, Article 111, Jun. 2023, pp. 111-111: 24.

Rocha Da Rosa, Feilipe et al., "Using Machine Learning Techniques to Evaluate Multicore Soft Error Reliability," IEEE Transactions on Circuits and Systems-I: Regular Papers, vol. 66, No. 6, Jun. 2019, pp. 2151-2164.

Vieira, Marco et al., "Fault Injection for Failure Prediction Methods Validation," Fifth Workshop on Hot Topics in System Dependability (HotDep 2009), Mar. 2009, pp. 1-6.

Wang, Qing et al., "Fault Injection Based Interventional Causal Learning for Distributed Applications," The Thirty-Seventh AAAI Conference on Artificial Intelligence (AAAI-23), Article No. 1799, Feb. 2023, pp. 15738-15744.

Artificial intelligence (AI) vs. machine learning (ML), Google Cloud, Jul. 21, 2025, 10 pages, https://cloud.google.com/learn/artificial-intelligence-vs-machine-learning?hl=en.

* cited by examiner

| INJECTED ERROR(S) | POTENTIAL PATH(S) | SYNDROME RETURN BY SYSTEM MODEL BY SIMULATED WORKLOAD |
|---|---|---|
| e1 | P1 | SyndromeX1 |
| e2 | P2 | SyndromeX2 |
| e3 | P3 | SyndromeX3 |
| e4 | P4, P5 | SyndromeX4 |
| e5, e6 | P6 | SyndromeX5 |

MACHINE LEARNING MODEL TRAINING TO ASSIST IN SYSTEM DEBUG

BACKGROUND

One or more aspects relate, in general, to facilitating processing within a computing environment, in more particularly, to providing a machine learning-based, system debug facility to enhance debugging of a system, such as a system under test.

Debugging refers to a process of identifying and correcting errors or faults, such as system level faults. In one or more aspects, a system fault can be a hardware system fault, with the system being, for instance, an electronic device, integrated circuit, logic unit, machine, computing system, etc. Errors or faults at a system test level while running a workload are typically reported as an error code set or error syndrome.

SUMMARY

Certain shortcomings of the prior art are overcome, and additional advantages are provided herein through the provision of a computer-implemented method and facilitating processing within a computing environment. The computer-implemented method includes generating a data set for training a machine learning model to predict fault location in a system. The generating includes injecting, at a selected location of the system, a test fault into a simulation of the system using a workload, and recording a respective error syndrome generated by the simulation resulting from injecting the test fault into the simulation at the select location. In addition, the generating includes repeating injecting, at one or more other selected locations, of one or more other test faults into the simulation of the system using the workload, and the recording of respective error syndromes generated by the simulation resulting from injecting the one or more other test errors into the simulation of the system to generate the data set. In addition, the computer-implemented method includes training, using the data set, the machine learning model to predict fault location within the system, and providing the trained machine learning model for use in debugging the system, where the debugging includes predicting, using the trained machine learning model, the fault location within the system based on an error syndrome generated by the system due to the fault.

Computer program products and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Aspects of the present disclosure and certain features, advantages, and details thereof, are explained more fully below with reference to the non-limiting example(s) illustrated in the accompanying drawings. Descriptions of well-known systems, devices, processing techniques, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

Figure 1:
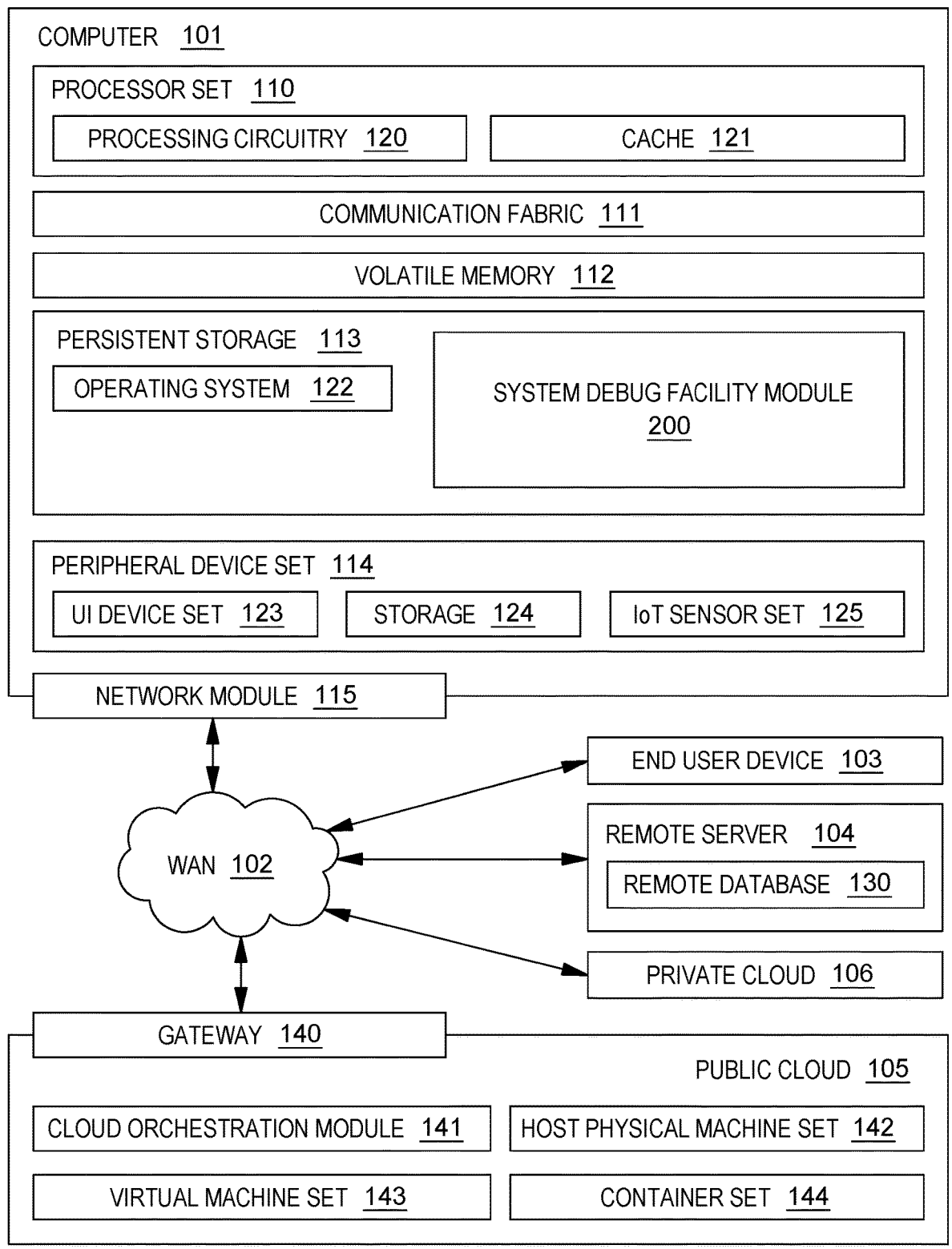
FIG. 1 depicts one example of a computing environment to include and/or use one or more aspects of present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and system debug facility module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform intelligent workflow processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as system debug facility module 200. In addition to system debug facility module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system debug facility module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2A:
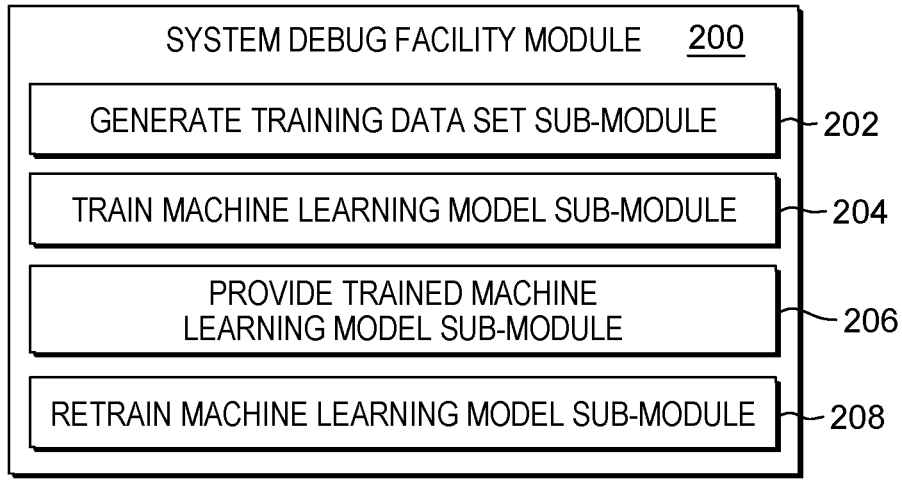
FIGS. 2A-2B depict one embodiment of a computer program product with a system debug facility module, in accordance with one or more aspects of present disclosure.
Figure 2B:
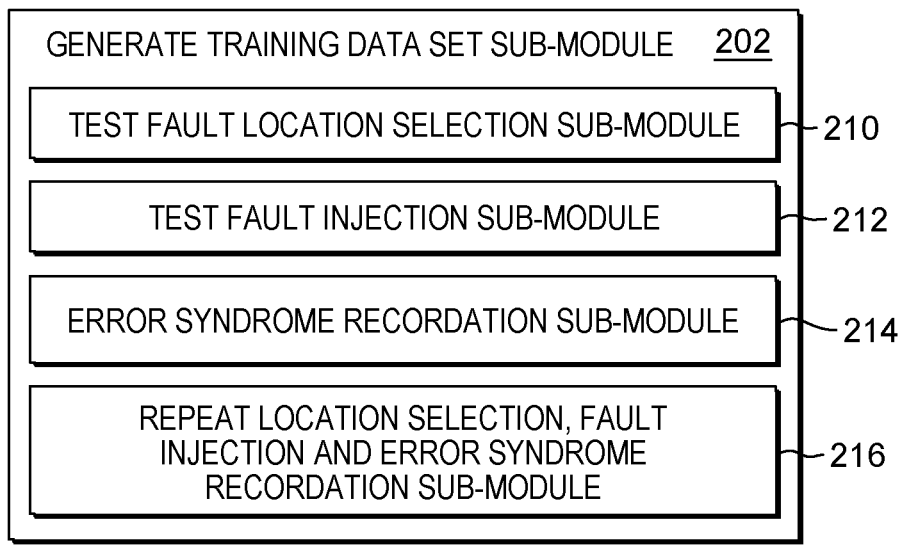
Figure 3A:
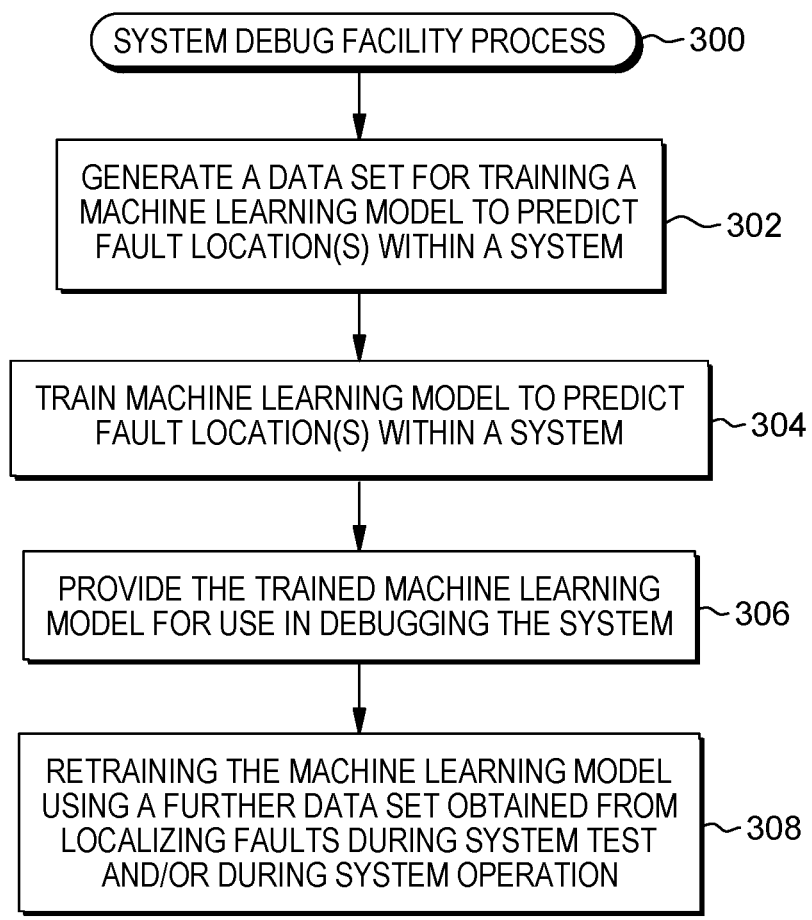
FIGS. 3A-3B depict one embodiment of a system debug facility process, in accordance with one or more aspects of present disclosure.
Figure 3B:
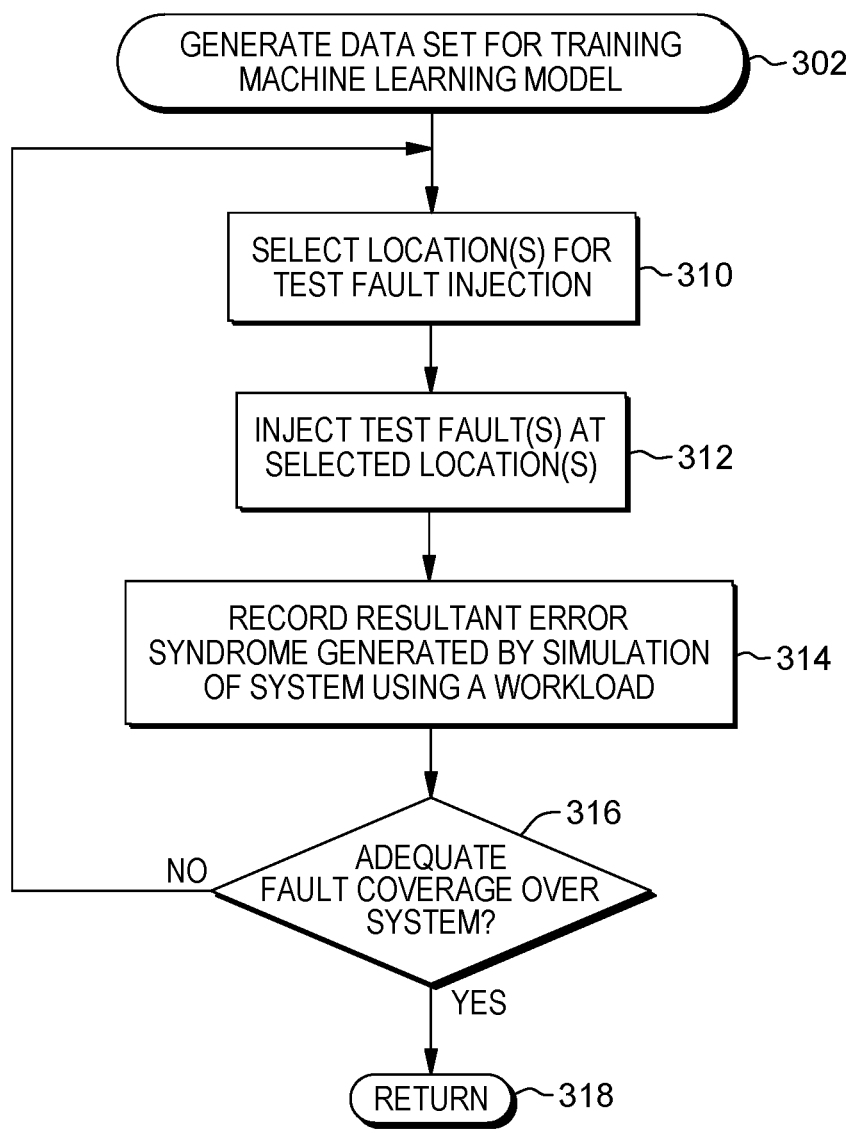

By way of example, one or more embodiments of a system debug facility module and process are described initially with reference to FIGS. 2A-3B. FIGS. 2A-2B depict one embodiment of system debug facility module 200 that includes code or instructions to perform system debug facility-related processing, in accordance with one or more aspects of the present disclosure, and FIGS. 3A-3B depicts one embodiment of a system debug facility process, in accordance with one or more aspects of the present disclosure.

Referring to FIGS. 1-2B, system debug facility module 200 includes, in one example, various sub-modules used to perform processing, in accordance with one or more aspects of the present disclosure. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; one or more processor sets 110 (FIG. 1); processors, such as one or more processors of processor set 110; and/or processing circuitry, such as processing circuitry of processor set 110, etc.

As noted, FIGS. 2A-2B depict one embodiment of a system debug facility module 200 which, in one or more embodiments, includes, or facilitates, system debug facility processing in accordance with one or more aspects of the present disclosure. In the embodiment of FIGS. 2A-2B, example sub-modules of system debug facility module 200 include a generate training data set sub-module 202 to facilitate generating a data set for training a machine learning model to predict a fault location in a system. In addition, system debug facility module 200 includes a train machine learning sub-module 204 to train, using the generated data set, a machine learning model to predict fault location within the system, and a provide trained machine learning model sub-module 206 to provide the model for use in debugging the system, where the debugging includes predicting, using the trained machine learning model, the fault location within the system based on an error syndrome generated by the system due to the fault. In addition, in one or more embodiments, system debug facility module 200 includes a retrain machine learning model sub-module 208 to facilitate retraining or refining the machine learning model by generating one or more further data sets by, for instance, deploying the machine learning model to localize faults during system test and/or during system operation in the field, including with different workloads, and retraining the machine learning model using the further data sets.

As illustrated in FIG. 2B, generate training data set sub-module 202 includes, in one or more embodiments, a test fault location selection sub-module 210 to facilitate selecting the location in a system for injecting a test fault, and a test fault injection sub-module 212 to inject, at the selected location in the system model, a test fault into a simulation of the system using a workload. In addition, in one or more embodiments, generate training data set sub-module 202 includes an error syndrome recordation sub-module 214 to record a respective error syndrome (or error data set) generated by the simulation resulting from injecting the test fault into the simulation at the selected location. In one or more embodiments, generate training data set sub-module 202 also includes a repeat location selection, fault injection and error syndrome recordation sub-module 216 to repeat (for instance, until a desired system coverage is obtained) location selection, fault injection and error syndrome recordation to facilitate generating the data set for training the machine learning model for the workload to predict the fault location in the system.

Note that although various sub-modules are described herein, system debug facility module processing, such as disclosed, can use, or include, additional, fewer, and/or different sub-modules. A particular sub-module can include additional code, including code of other sub-modules, or less code. Further, additional and/or fewer sub-modules can be used. Many variations are possible.

Advantageously, in one or more aspects, improved processing within a computing environment is disclosed by, for instance, providing a system debug facility module and process for generating a data set for training a machine learning model to predict fault location in a system, such as a hardware system, and training, using the generated data set, the machine learning model to predict fault location(s) within the system. In addition, the process includes providing the trained machine learning model for use in debugging the system, where the debugging includes predicting, using the trained machine learning module, a fault location within the system based on an error syndrome generated by the system due to the fault. In one or more embodiments, the generated data set includes a table generated based on injecting errors/faults at various selected locations (e.g., significant paths) in the system level model, and collecting the resultant error syndromes due to the injected faults. The generated data set(s) are used to train or create a machine learning model, which is then tested with different sets of injected faults, and corresponding syndromes. When a functional workload encounters a fault, use of the machine learning model to identify, for instance, the most likely location (e.g., path(s)) from which the error originated, advantageously facilitates debugging of the fault as well as correction of the error, and thus facilitates processing within the computing environment. In one or more embodiments, the system debug facility disclosed isolates the fault analysis down to a few paths identified by the machine learning model as containing the fault. Advantageously, the machine learning model incrementally becomes more accurate as the model is retrained or refined by feeding back learned data from real hardware faults in the system during different workloads. In one or more embodiments, simulation-based data is generated to identify potential locations where a fault likely originated in the system (e.g., device, integrated circuit, chip, unit, hardware system, etc.), and apply the generated data to training the machine learning model. In one or more embodiments, the selected locations to inject faults can be identified using different approaches. For instance, in one or more implementations, one or more verification experts can identify or select the fault inject locations deterministically, or semi-deterministically, or randomly, or apply techniques such as equivalence testing to provide an exhaustive set of error inject locations for smaller or simpler systems, such as smaller or simpler circuit products (e.g., smaller than large scale integrated circuits).

In one or more embodiments, the system debug facility module is used, in accordance with one or more aspects of the present disclosure, to perform system debug facility-related processing. FIGS. 3A-3B depict one example of a system debug facility process 300, such as disclosed herein. The process is executed, in one or more embodiments, by a computer (e.g., computer 101 (FIG. 1)), and/or one or more processor sets, such as a processor or processing circuitry (e.g., of processor set 110 of FIG. 1). In one example, code or instructions implementing the process, are part of a module, such as system debug facility module 200. In other examples, the code can be included in one or more other modules and/or one or more other sub-modules of the one or more other modules. Various options are available.

As illustrated in FIG. 3A, in one example, system debug facility process 300 executing on one or more computers (e.g., computer 101 of FIG. 1), one or more processor sets (e.g., processor set 110 of FIG. 1, such as a processor of processing circuitry of the processor set) generates a data set for training a machine learning model to predict fault location(s) within a system 302. As illustrated in FIG. 3B, generating the data set for training the machine learning model includes, in one or more embodiments, selecting one or more locations for test fault injection 310 and injecting one or more test faults at the selected location(s) 312. Further, in one or more embodiments, generating the data set includes recording the resultant error syndrome generated by simulation of the system using a workload due to the injected test fault(s) 314. Note that as used herein, an error syndrome is, or includes, an error code set which has one or more error codes, such as one or more error codes generated by a simulation of the system model using a particular workload. In one or more embodiments, generating the data set for training the machine learning model determines whether adequate fault coverage over the system has been generated 316, and if not, then repeats: determining one or more selected location(s) for test fault injection 310; the injecting of test fault(s) at the selected location(s) 312; and the recording of a resultant error syndrome(s) generated by the system simulation using the workload 314, until adequate fault coverage has been generated, after which the process returns 318 to the process flow of FIG. 3A (in one example). Note that generating the data set for training the machine learning model can include generally a reduced set of error syndromes and/or a reduced set of fault injections to, for instance, obtain a minimally adequate coverage of the system level model using a particular workload, to train the machine learning model for predicting location of a fault based on an error syndrome generated by the system due to the fault, such as in a test environment and/or operational environment. In one example, adequate fault coverage can include coverage of potential paths through the system, coverage of principal hardware components of the system, etc.

As illustrated in FIG. 3A, system debug facility process 300 further includes (in one or more embodiments) training the machine learning model to predict fault location(s) within a system 304. For instance, as one specific example, the machine learning model being trained can be a multiple-class classifier to predict fault locations based on recorded error syndromes or error codes. The training can use, for instance, a traditional train/test data set split, feature extraction, a confusion matrix, F-score, and/or other machine learning (ML) techniques. In one or more embodiments, system debug facility process 300 further includes providing the trained machine learning model for use in debugging the system 306, such as within a system test environment and/or an operational environment of the system. In one or more implementations, the machine learning model can be retrained or refined using further data sets obtained from localizing faults during system test and/or during system operation 308.

In one or more embodiments, processing within a computing environment is facilitated by providing a machine learning model to predict where a specific error syndrome output is originating from within a system. In one or more aspects, the computing environment is improved by providing a better approach to debugging fault(s) within a system, such as a fault within a hardware system. Advantageously, simulation-based data is generated to provide potential points or data where an error or fault could have originated in the system, and this data set is then used to train the machine learning model. Determining the locations where to inject the faults can be accomplished using a variety of approaches, as desired for a particular machine learning model and system. For instance, the locations can be selected deterministically, such as by a verification expert identifying specific injection locations or critical paths, or semi-deterministically, or randomly, or exhaustively generating a training data set, particularly for a smaller/simpler system.

In one or more aspects, the computing systems and processes disclosed use artificial intelligence (e.g., execute an artificial intelligence agent) to provide the train machine learning model for use in debugging the system. In one or more embodiments, artificial intelligence includes machine learning, which can further include deep learning comprised of neural networks. In one aspect, artificial intelligence, such as, but not limited to, generative artificial intelligence, generative pretrained transformer and large language model capabilities, can use deep learning models that take raw data and learn to generate statistically probable outputs. Artificial intelligence enables a computing system or device (e.g., at least one artificial intelligence agent executing on the computing system) to obtain and/or derive information, learn from that information, and generate specific outputs, such as identifying a probable fault location within a system, to facilitate a user performing a particular debugging process, thereby improving processing, including processing within the computing system. Processing capabilities are improved by using, for instance, communication networks to access one or more data sources, to obtain data that is analyzed and used to take action (e.g., predict a likely fault location within a system) to facilitate carrying out a debugging process, that may otherwise take longer to complete. Thus, debugging speed and resultant fault correction are improved by providing, in one or more aspects, customized debug assistance to the debug process.

Figure 4:
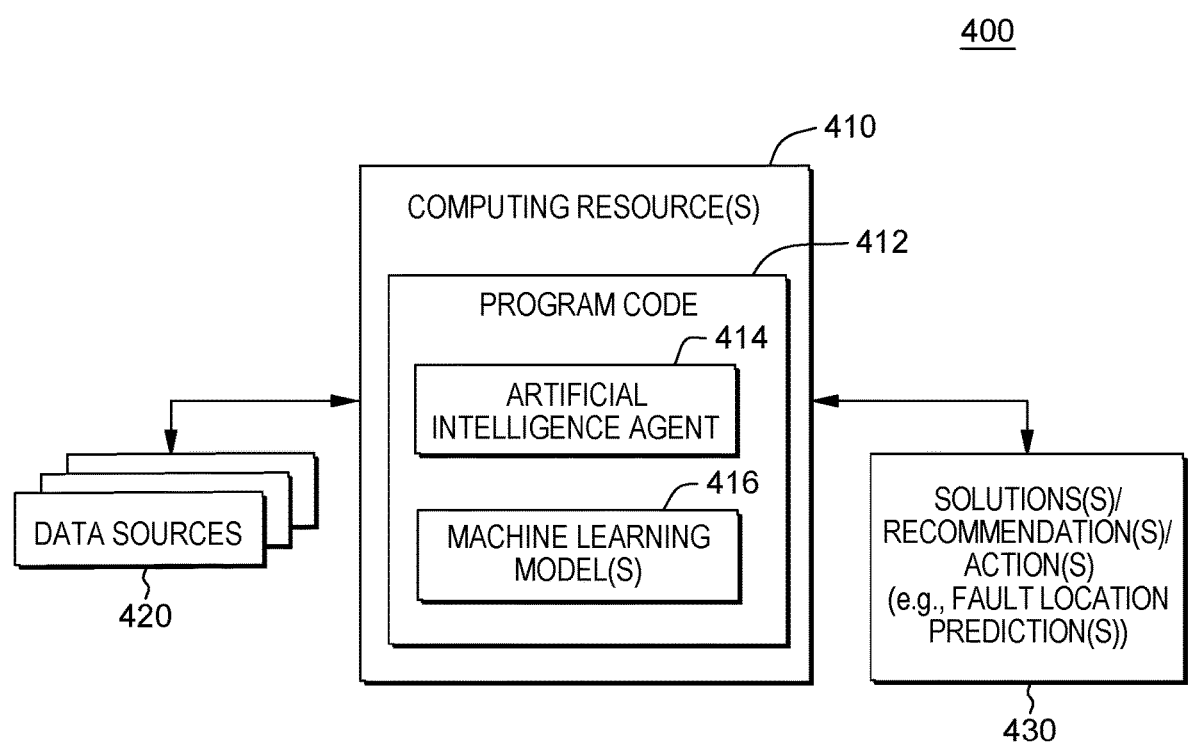
FIG. 4 is a further example of a computing environment to include and/or use one or more aspects of present disclosure.

By way of further explanation, FIG. 4 depicts another embodiment of a computing environment or system 400, which can incorporate, or implement, one or more aspects of an embodiment of the present disclosure. In one or more implementations, system 400 is implemented as part of, or includes, a computing environment, such as computing environment 100 described above in connection with FIG. 1. System 400 includes one or more computing resources 410, such as one or more computers 101 of FIG. 1, that execute program code 412 that implements, for instance, one or more aspects of a module or facility such as disclosed herein, and which includes an artificial intelligence agent or system 414, which trains and (in one embodiment) utilizes one or more machine learning models 416, such as described herein. In one embodiment, data, such as a data set generated as described herein can be used by artificial intelligence agent 414, to train model(s) 416 to (for instance) predict one or more fault locations within a system based on an error syndrome generated by the system due to the fault(s) to facilitate debugging of the system, and in one or more embodiments, correction of the system to remove the fault, and/or other related actions 430, etc., based on the particular application of the machine-learning model(s) to facilitate achieving the processes disclosed. In implementation, system 400 can include, or utilize, one or more networks for interfacing various aspects of computing resource(s) 410, as well as one or more data sources 420 providing data, and one or more components, systems, etc., receiving an output, action, etc., 430 of machine learning model(s) 416 to facilitate performance of one or more artificial intelligence agent operations. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 410 house and/or execute program code 412 configured to perform computer-implemented methods in accordance with one or more aspects of the present disclosure. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other embodiments, computing resource(s) 410, which implements one or more aspects of processing such as discussed herein, can, at least in part, be implemented in multiple separate computing resources or systems, such as one or more computing resources of a cloud-hosting environment, by way of example.

Briefly described, in one embodiment, computing resource(s) 410 can include one or more processor sets with one or more processors, for instance, central processing units (CPUs). Also, the processor set(s) can include functional components used in the integration of program code, such as functional components to fetch program code from locations in such as cache or main memory, decode program code, and execute program code, access memory for instruction execution, and write results of the executed instructions or code. The processor set(s) can also include a register(s) to be used by one or more of the functional components. In one or more embodiments, the computing resource(s) can include memory, input/output, a network interface, and storage, which can include and/or access, one or more other computing resources and/or databases, as required to implement the artificial intelligence agent and machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s), or computing system(s) or competitor(s), which can implement one or more aspects disclosed are described further herein with reference to the figures.

As noted, in one embodiment, program code 412 includes, or executes, an artificial intelligence agent 414 which trains and, optionally uses, one or more machine learning models 416. The models can be trained using training data that can include a variety of types of data, such as disclosed herein. In one or more embodiments, program code 412 executing on one or more computing resources 410 applies one or more algorithms of, for instance, artificial intelligence agent 414 to generate and train the model(s), which the program code then utilizes to, for instance, predict one or more fault locations in the system based on an error syndrome generated by the system, or a simulation of the system. In an initialization or learning stage, program code 412 trains the one or more machine learning models 416 using obtained training data that can include, in one or more embodiments, error syndrome data, fault injection data, potential error propagation paths through the system, etc.

Data used to train the models (in one or more embodiments of the present disclosure) can include a variety of types of data, such as heterogeneous user data (or user-related data) generated by one or more data sources and/or data stored in one or more databases accessible by, the computing resource(s). Program code, in embodiments of the present disclosure, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information, concepts/visual insights, tradeoff analytics, document conversion, and/or relationship extraction. In an embodiment, one or more programs analyze the data obtained by the program code from one or more sources utilizing one or more of a natural language classifier, retrieve-and-rank application programming interfaces, and tradeoff analytics application programing interfaces, etc.

In one or more embodiments, the program code can utilize one or more neural networks to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine-learning model, such as described herein.

Figure 5:
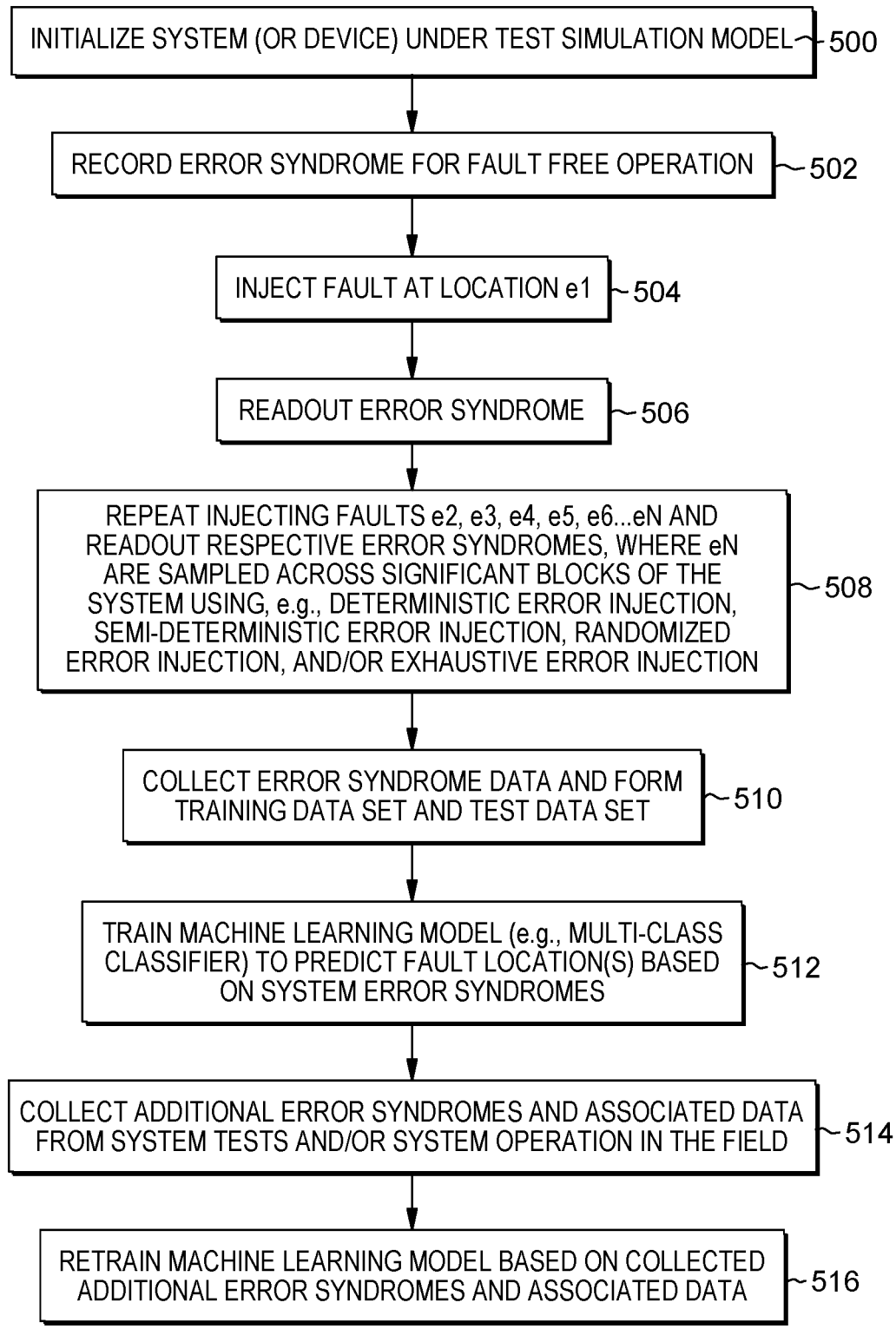
FIG. 5 depicts a further embodiment of a system debug facility process, in accordance with one or more aspects of the present disclosure.

FIG. 5 depicts a further embodiment of a system debug facility process, in accordance with one or more aspects of present disclosure. As illustrated, in one or more embodiments, the system debug facility process includes initializing a system under test simulation model 500, where the system is, in one or more embodiments, a hardware system, such as a device, integrated circuit, chip, logic unit, computer system, etc. Processing records an error syndrome for fault free operations 502 and injects a fault or error at a selected location e1 504, such as at a selected critical path of the system. The process reads out and records the respective error syndrome generated by the simulation resulting from injecting the test fault into the simulation at the selected location 506. Note that in this regard that the test fault is injected into the simulation of the system using a workload.

In one or more embodiments, the process includes repeating injecting faults e2, e3, e4, e5, e6 . . . eN and reading out respective error syndromes for each fault, where faults eN are sampled across significant blocks of the system using, for instance, deterministic error injection, semi-deterministic error injection, randomized error injection and/or exhaustive error injection 508. As noted, the error syndromes are generated by the system simulation model for a particular workload. The process further includes, in one or more embodiments, repeating the injecting of faults and recording of error syndromes for a variety of different anticipated workloads or typical workloads for the system when in operation in the field, with a respective machine learning model solution being generated for each sample workload.

As illustrated, the error syndrome data is collected and used to form a training data set and a test data set 510, with the training data set being using to train a machine learning model to predict fault locations based on the error syndromes for the particular system workload 512. In one embodiment, the machine learning model can be a multi-class classifier to predict error locations based on recorded error syndromes or error codes using, for instance, a traditional train/test data split, feature extraction, confusion matrix, F-score, and/or conventional machine learning techniques.

In one or more embodiments, additional error syndromes and associated data are collected from system tests and/or system operation in the field 514. When error locations are misclassified in the field based on comparison to the closest workload-based machine learning model solution, one or more machine learning models can be retrained or refined using the collected additional error syndromes and associated data for model improvement 516.

FIGS. 6A-6E depict exemplary fault injections at selected locations of a system simulation, in accordance with one or more aspects of present disclosure. As illustrated in FIGS. 6A-6E, system 600 can be a hardware system model which includes multiple components, such as, an input latch bank from a prior unit 602, one or more memory arrays 604, a latch bank 606, additional logic 608, a multiplexer 610, further additional logic 612, and an output latch bank 614, by way of example only. As described herein, in one or more aspects, simulation-based data is used to identify potential points or locations where a fault originated in the system (e.g., hardware system, device, chip, integrated circuit, hardware unit, etc.) and apply this data set to generating one or more machine learning models. The location where to inject faults can be accomplished with different approaches, such as, for instance, having a debug verification expert identify desired inject locations deterministically, or semi-deterministically, or randomly, or applying techniques such as equivalent class testing to provide an exhaustive set of error injections, such as for smaller and/or simpler chip or device products.

Figure 6A:
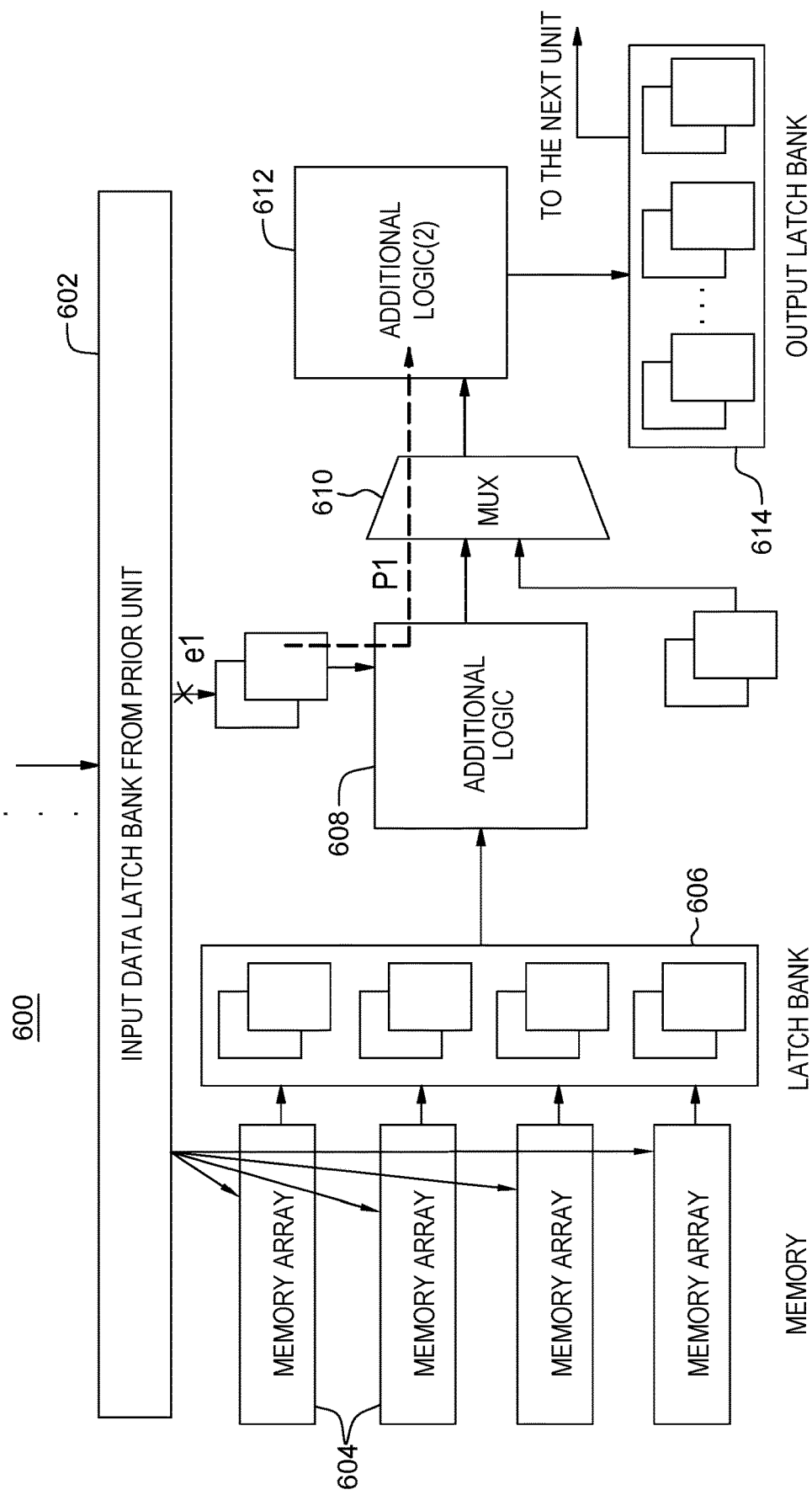
FIGS. 6A-6E depict exemplary fault injections at select locations of a system simulation, in accordance with one or more aspects of present disclosure.
Figure 6B:
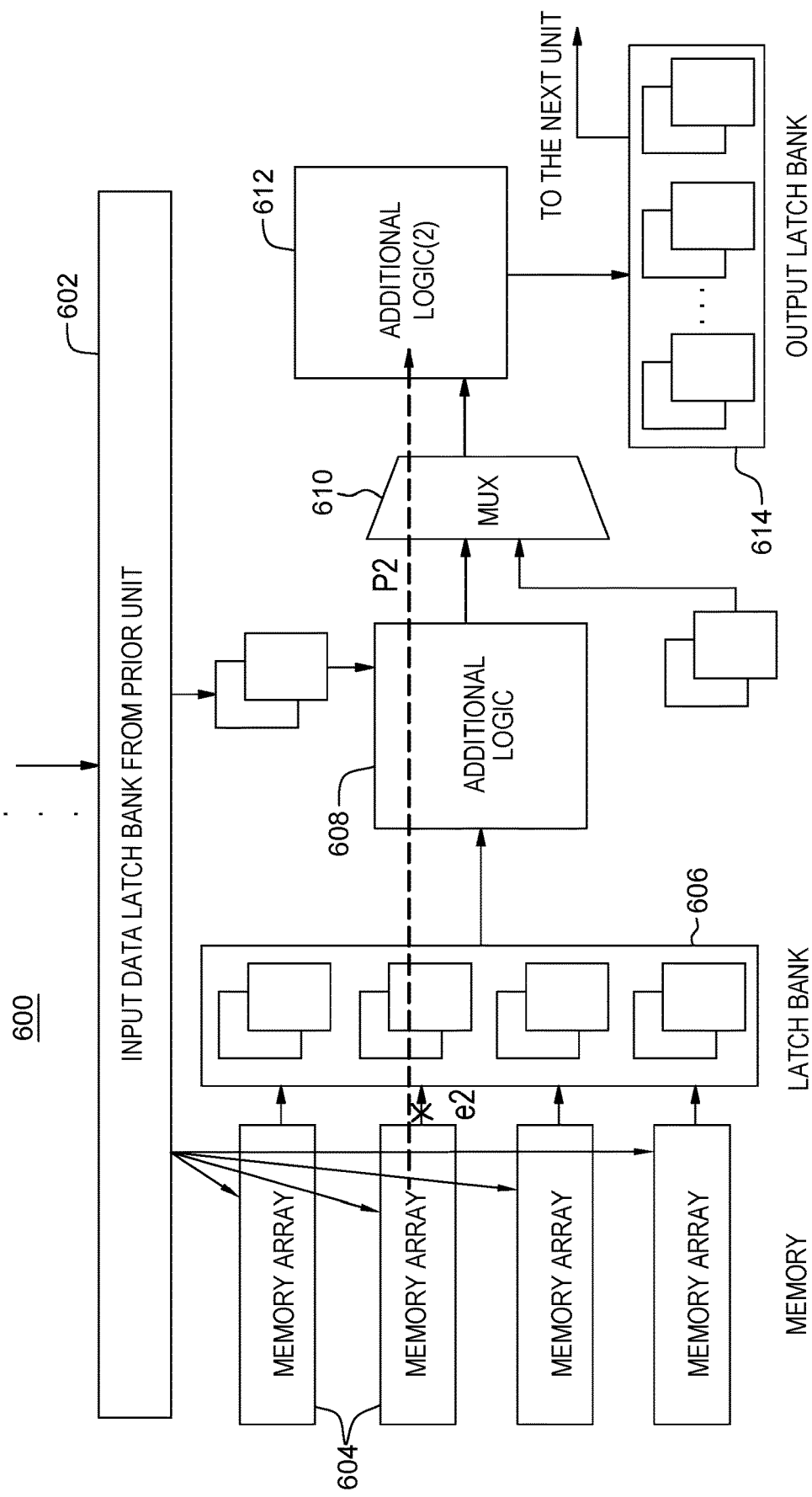
Figure 6C:
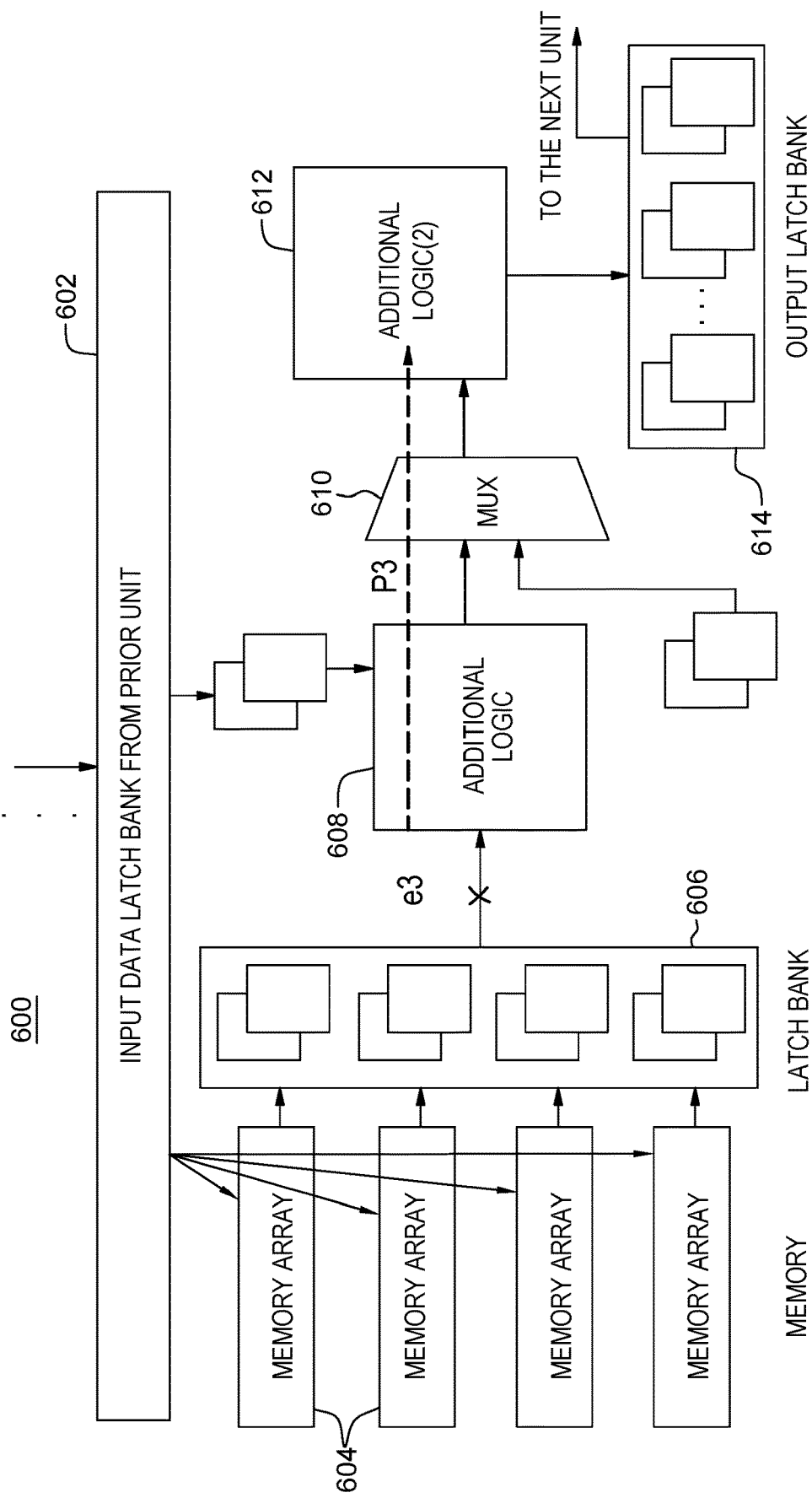
Figure 6D:
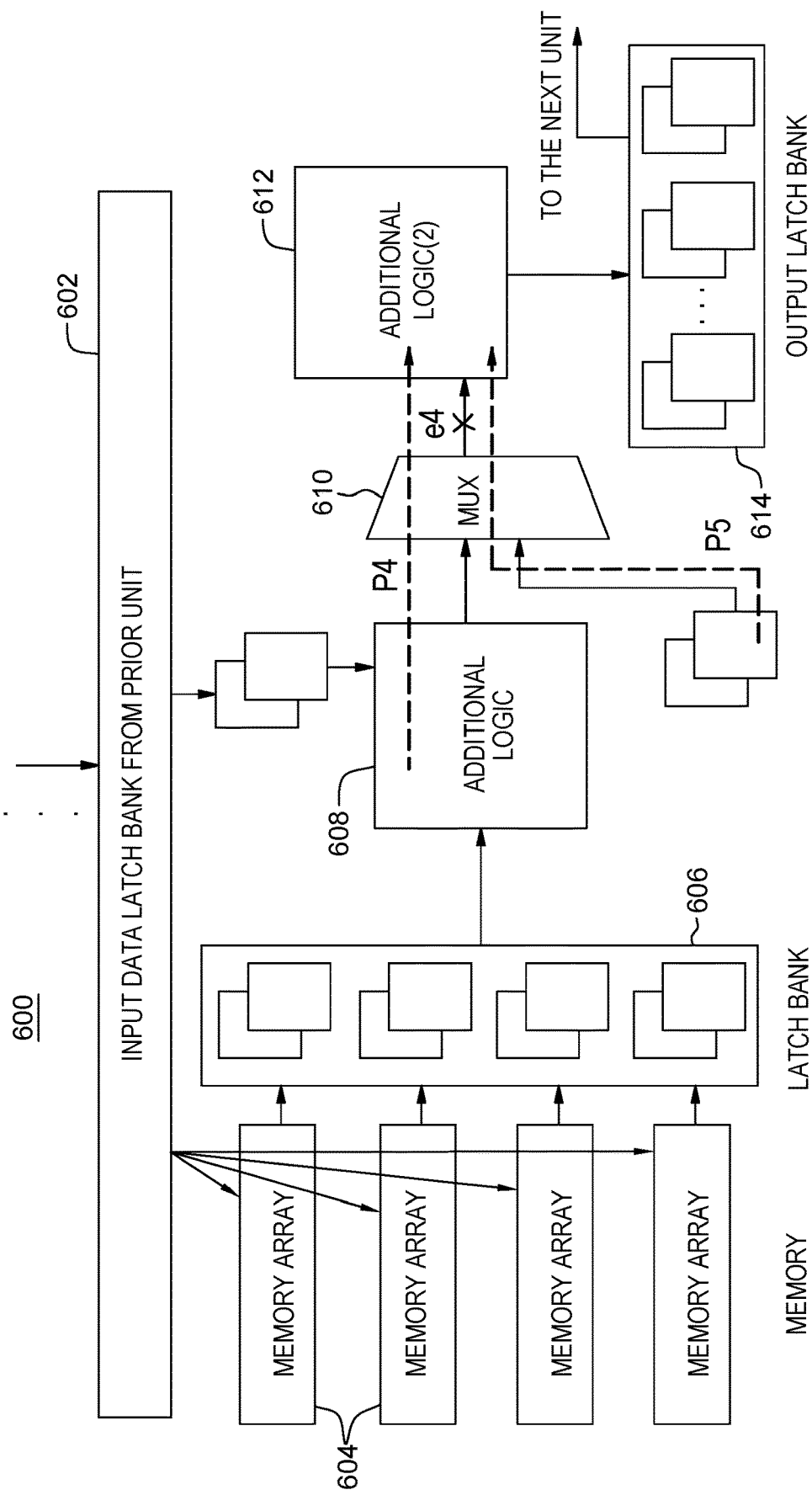
Figure 6E:
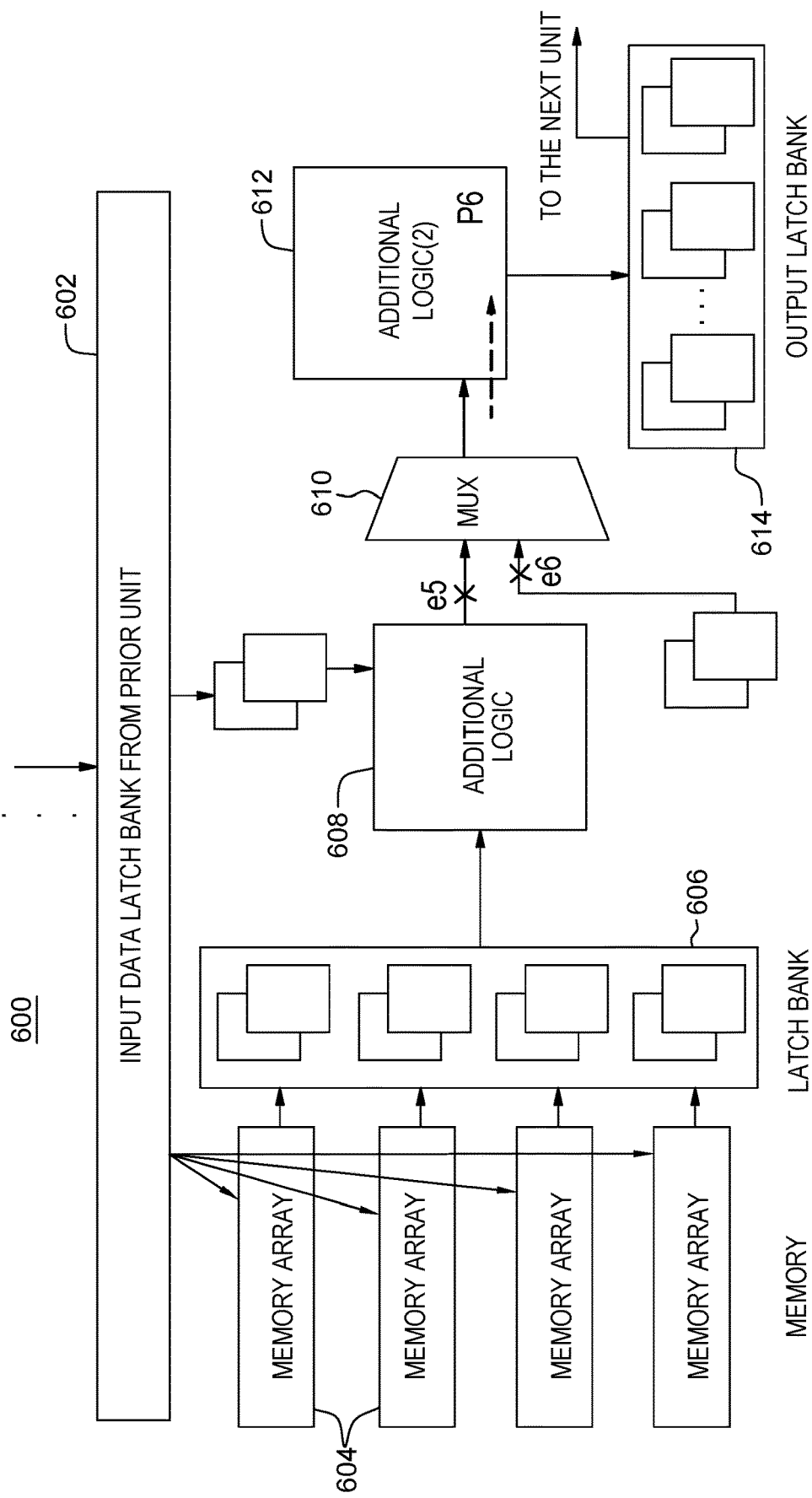

In the representative system 600 level block drawings of FIG. 6A-6E, faults or errors e1, e2, e3, e4, e5, e6 . . . eN are injected into the system level model, and the different error syndromes are read out and saved for each test case. In FIG. 6A, error fault e1 is injected, and the potential or likely error propagation path P1 is recorded, along with the resultant error syndrome, SyndromeX1. In FIG. 6B, a fault e2 is injected at a different selected location, and its corresponding potential error propagation path P2 is recorded, along with the corresponding error syndrome, SyndromeX2. In FIG. 6C, a fault e3 is injected between latch bank 606 and additional logic 608, and the corresponding likely propagation path P3 is recorded, along with the return simulated workload error codes SyndromeX3. In FIG. 6D, a fault e4 is injected between multiplexer 610 and additional logic 612 at the output of the multiplexer, meaning that multiple potential paths P4, P5 can be affected by the single injected error. Accordingly, each potential path affected P4, P5 is recorded, along with the respective system simulation error SyndromeX4. In FIG. 6E, multiple faults e5, e6 are injected at the input to multiplexer 610, and the corresponding affected path P6 is recorded, along with the respective system simulation error syndrome, SyndromeX5.

Figures 7A, 7B:
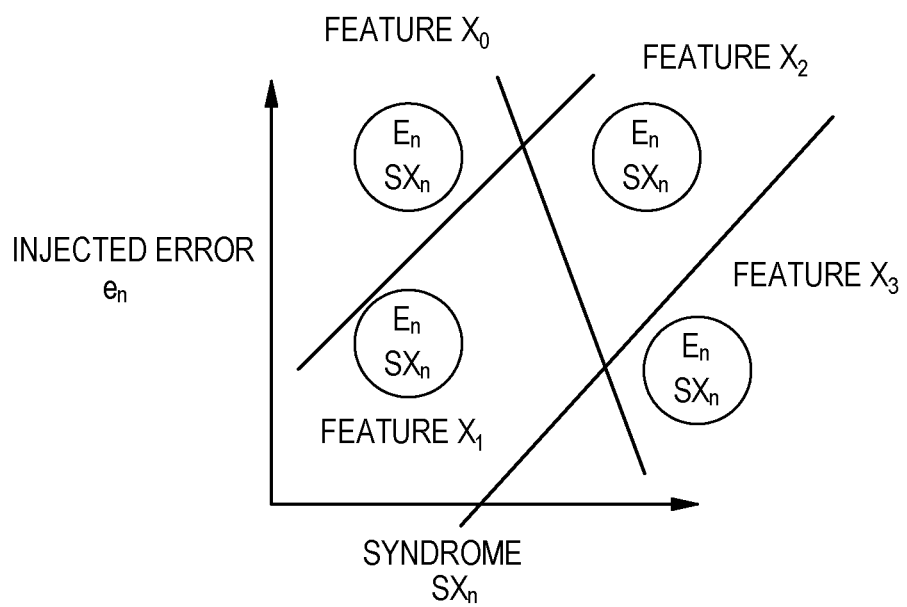
FIG. 7A depicts an exemplary table with a generated data set for use in training a machine learning model of the system debug facility, in accordance with one or more aspects of present disclosure.
FIG. 7B graphically illustrates identification of features relating injected faults to resulting error syndromes, in accordance with one or more aspects of present disclosure.

FIG. 7A depicts an example of a truth table assembled by the system debug facility process to, for instance, facilitate training one or more machine learning models to predict fault locations within the system. In the example of FIG. 7A, the injected errors (e1 . . . e6), potential paths (P1 . . . P6) and syndromes (SyndromeX1 . . . SyndromeX6) returned by the system model using the simulated workload described above in connection with FIGS. 6A-6E, are illustrated as an example only.

FIG. 7B graphically illustrates identification of features relating injected faults to resultant error syndromes, in accordance with one or more aspects of present disclosure. Feature extraction refers to a process of transforming raw data into numerical features that can be processed, while perservering the information in the original data set. The resultant feature identifications can be used in association with a machine learning process, such as described further herein below with reference to FIGS. 8-10.

As noted, locations for injecting faults can be determined deterministically, semi-deterministically, randomly, and/or exhaustively for a particular system depending, for instance, on one or more factors, such as the size or complexity of the system (e.g., small and/or simpler circuits or chips compared with large (or very large) scale integrated circuits or chips. Deterministic training data generation can include, in one or more embodiments, an expert identifying critical paths through the system where errors or faults most often occur, and injecting test faults at those locations, and identifying the respective failing error syndromes, as well as the applicable propagation path(s) for training the machine learning model. The training data can be considered deterministic in this case, and as noted, be applicable for large system models where exhaustive of semi-random error injection would be too time consuming to realistically implement. Semi-deterministic training data generation can include, for instance, obtaining critical paths identified by a verification expert where errors most often occur and injecting faults or errors in the identified paths, and collect the failing path data and error syndrome data for training the machine learning model. In addition, random error injects can be used to generate further inject-path-syndrome sets, which can also be used to train the machine learning model. Note that in one or more embodiments, random training data generation can be automated, to fully automate the machine learning model generation process. In one or more embodiments, the random fault injects can be directed to provide coverage across the different sub-units of the particular system model.

In one or more implementations, a fully randomized training set generation approach can be used, particularly for smaller system models. In this approach, a netlist of hierarchical nodes across the system under test is obtained, and a randomized subset of those nodes is selected for fault injection. The randomized subset of nodes selected for fault injection is, in one or more embodiments, screened against the netlist hierarchy to ensure adequate coverage of major system blocks or sub-blocks of the system. If any sub-block is inadequately covered, a new randomized subset of nodes can be re-elected for fault injection. The randomized fault injects can be automated to provide coverage across the different sub-units of the system model.

In a further approach, an exhaustive training set generation can be used. In this approach, a netlist of hierarchical nodes across the system under test is obtained, and for a given sub-block, faults are sequentially injected into every node in the sub-block in an exhaustive fashion. Since all fault injections are random, the process can be automated to provide full coverage across the different sub-units of the system model. An example of how this can be accomplished is equivalence class testing (which facilitates reducing the number of test cases without compromising the test coverage) by treating the model as a black box. This aspect of the disclosure is particularly advantageous where the number of nodes in the sub-block is not excessive to a practical implementation.

Figure 8:
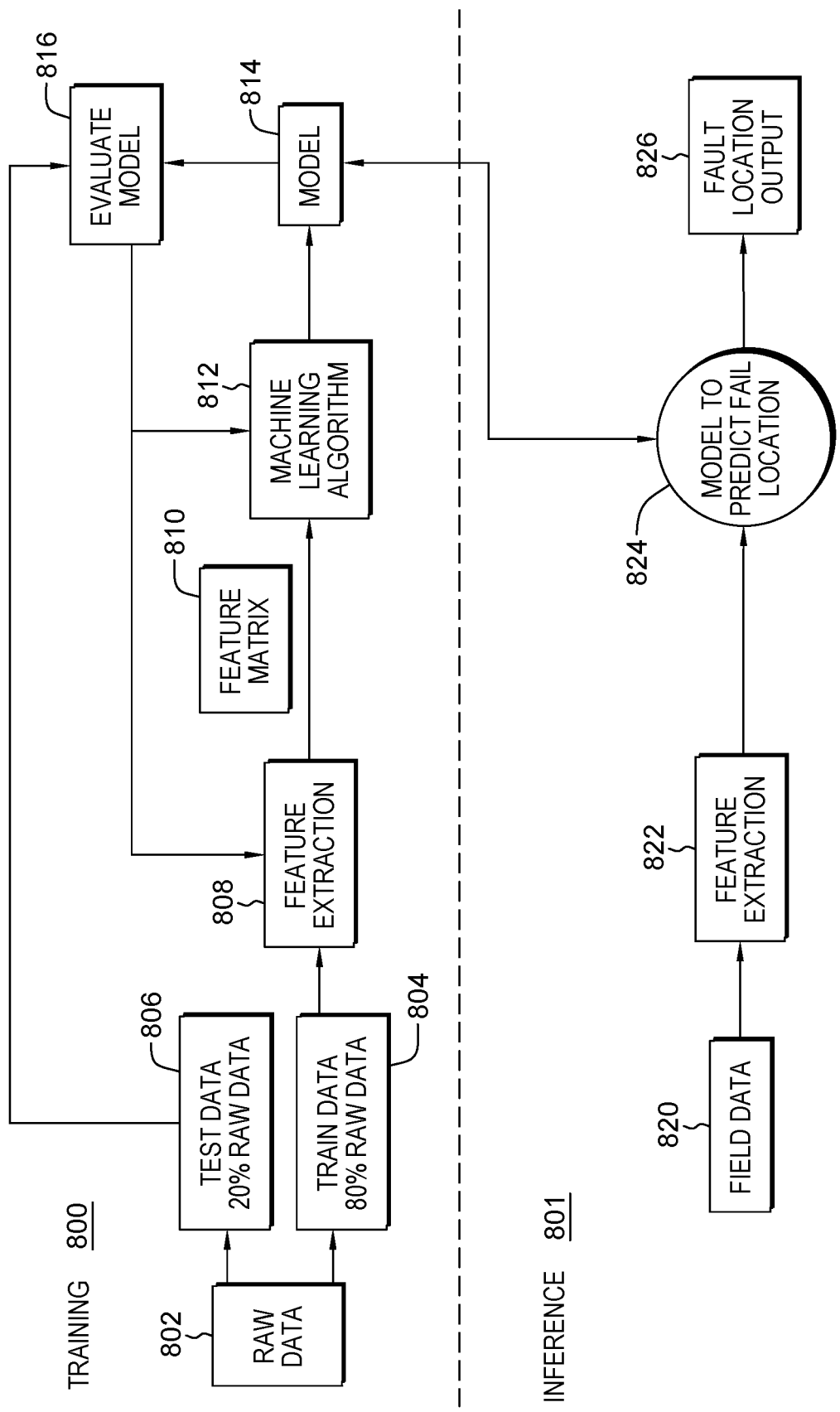
FIG. 8 depicts another example of a system debug facility workflow, in accordance with one or more aspects of present disclosure.

FIG. 8 illustrates another example of a system debug facility workflow, in accordance with one or more aspects of present disclosure. As illustrated, the workflow is divided into a training process 800, and an inference process 801. In training process 800, the machine learning model is trained on a system simulation level model, with a wide variety of injected faults across a range of critical paths of the system, such as for each of the units of the system, and their corresponding error syndromes. For instance, in one embodiment, raw test data 802, such as described herein, is initially divided into training data and testing data, with for instance, 80% of the raw data being used to train the machine learning model, and the remaining portion of the data 806 to be used to test the train machine learning model. The training data set 804 is used for feature extraction 808. In one or more embodiments, feature extraction refers to a process of transforming the raw data into numerical features that can be processed while preserving the information in the original data set. The result is a feature matrix 810, such as discussed above in connection with FIGS. 7A-7B. The feature matrix is used by a machine learning algorithm 812 to train the machine learning model 814. Once trained, the machine learning model can be evaluated 816 using the raw test data 806. Testing the model using the other set of inject-error syndrome data 806 facilitates validating the machine learning model 814. In one or more embodiments, the machine learning model is, for instance, a multi-class classification model to predict errors, such as likely fault paths in the system. In one or more embodiments, each feature in the model can represent a possible combination of faults and where they originate from, with for instance, the x-axis representing a given error in a system, and the y-axis representing a given syndrome, or vice versa.

As illustrated, inference process 801 can include obtaining field data 820, such as one or more error syndromes generated by the system operating in the field, and extracting from the obtained data one or more features 822 to generate a field feature matrix that is then used by the trained machine learning model to predict a fail (e.g., fault or error) location 824 within the system, and to provide a predicted fault location output 826 for use in facilitating debugging and correcting the system or system model.

Figure 9:
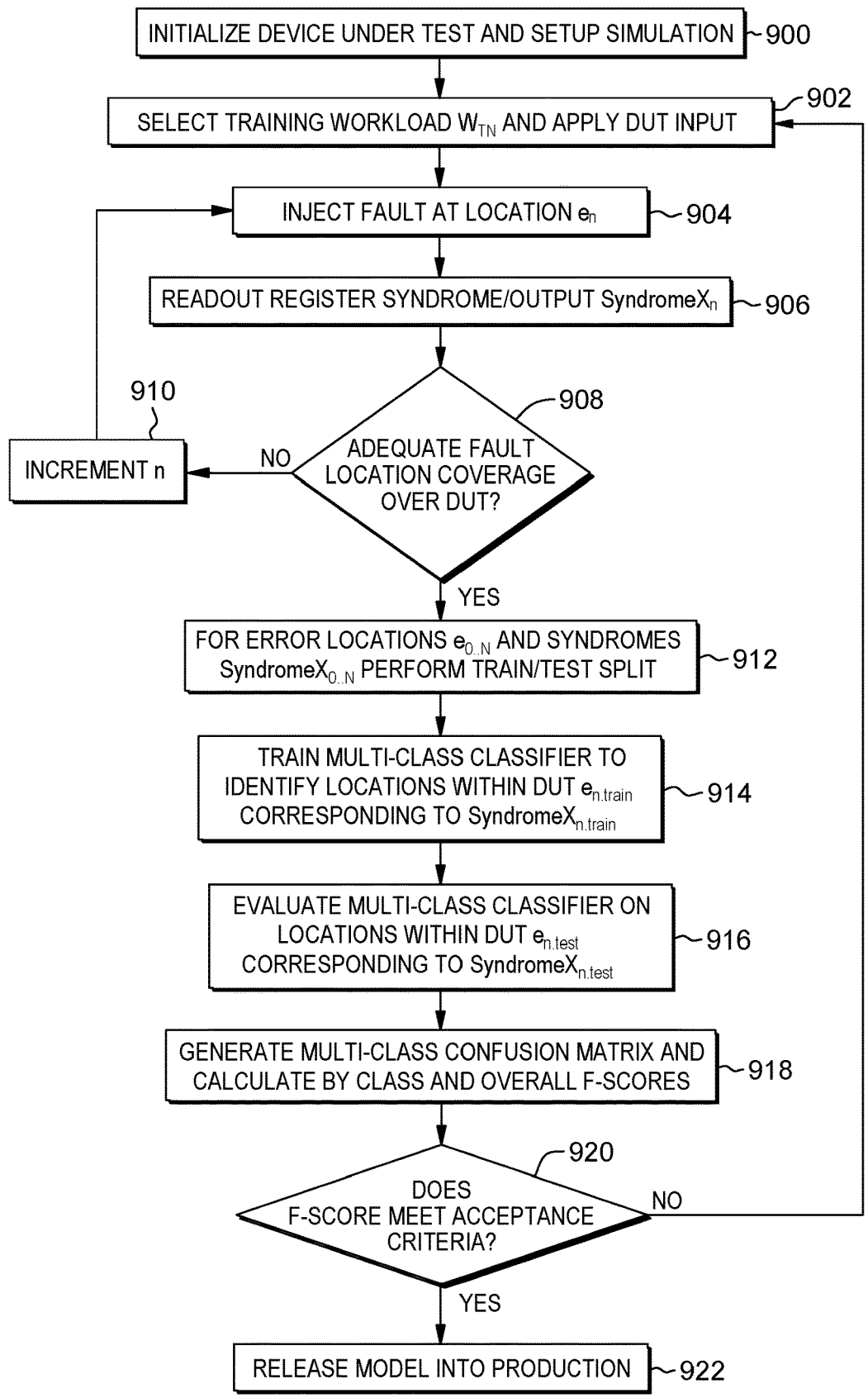
FIG. 9 depicts one embodiment of a machine learning model training process of a system debug facility, in accordance with one or more aspects of present disclosure.

FIG. 9 depicts a further embodiment of a machine learning model training process of a system debug facility, in accordance with one or more aspects of present disclosure. As illustrated, the process includes, in one or more embodiments, initializing the device or system under test, and setup the system simulation 900. A training workload $W_{TN}$ is selected and applied to the device under test input 902. A fault is injected at a selected location $e_n$ 904, and the process reads out (for instance, records) from a readout register the syndrome and/or output as an error syndrome SyndromeXn 906. The process determines whether adequate fault location coverage over the device under test has been achieved 908, and if "no", then increments n and injects a further fault at another selected location 904. The process repeats until adequate fault location coverage over the device under test is determined. Once there is adequate fault location coverage, then for error locations $e_{0\ldots N}$ and error syndromes SyndromeX$_{0\ldots N}$, the data set is split into a training data set and a testing data set 912. In one or more embodiments, the machine learning model includes a multi-class classifier to identify locations within the device under test corresponding to a particular syndrome. Multi-class classification is a machine learning classification with more than one class (i.e., non-binary classification). The machine learning model (e.g., multi-class classifier) is trained to identify locations within the device under test $e_{n,train}$ corresponding to SyndromeX$_{n,train}$ 914. Once the machine learning model is trained, the process includes evaluating the model (e.g., multi-class classifier) on locations within the device under test X$_{n,test}$ corresponding to SyndromeX$_{n,test}$ 916. The process can further include generating a multi-class confusion matrix and calculate by class overall F-scores 918. Note that in this regard that a confusion matrix can be a N×N matrix of N expected, and N predicted results, and it can be a visualization tool to determine model accuracy and/or performance. The F-score is, in one or more embodiments, a measure of model accuracy, such as how many times the model is correct. The F-score is the measure of a harmonic mean of precision and recall. Processing determines whether the F-score meets an acceptance criteria 920, and if "no", then the process returns to selecting another workload $W_{TN}$ and applying the workload to the device under test input 904 to repeat the process. Assuming that the F-score does meet the acceptance criteria, then the machine learning model is released into the production environment 922.

Figure 10:
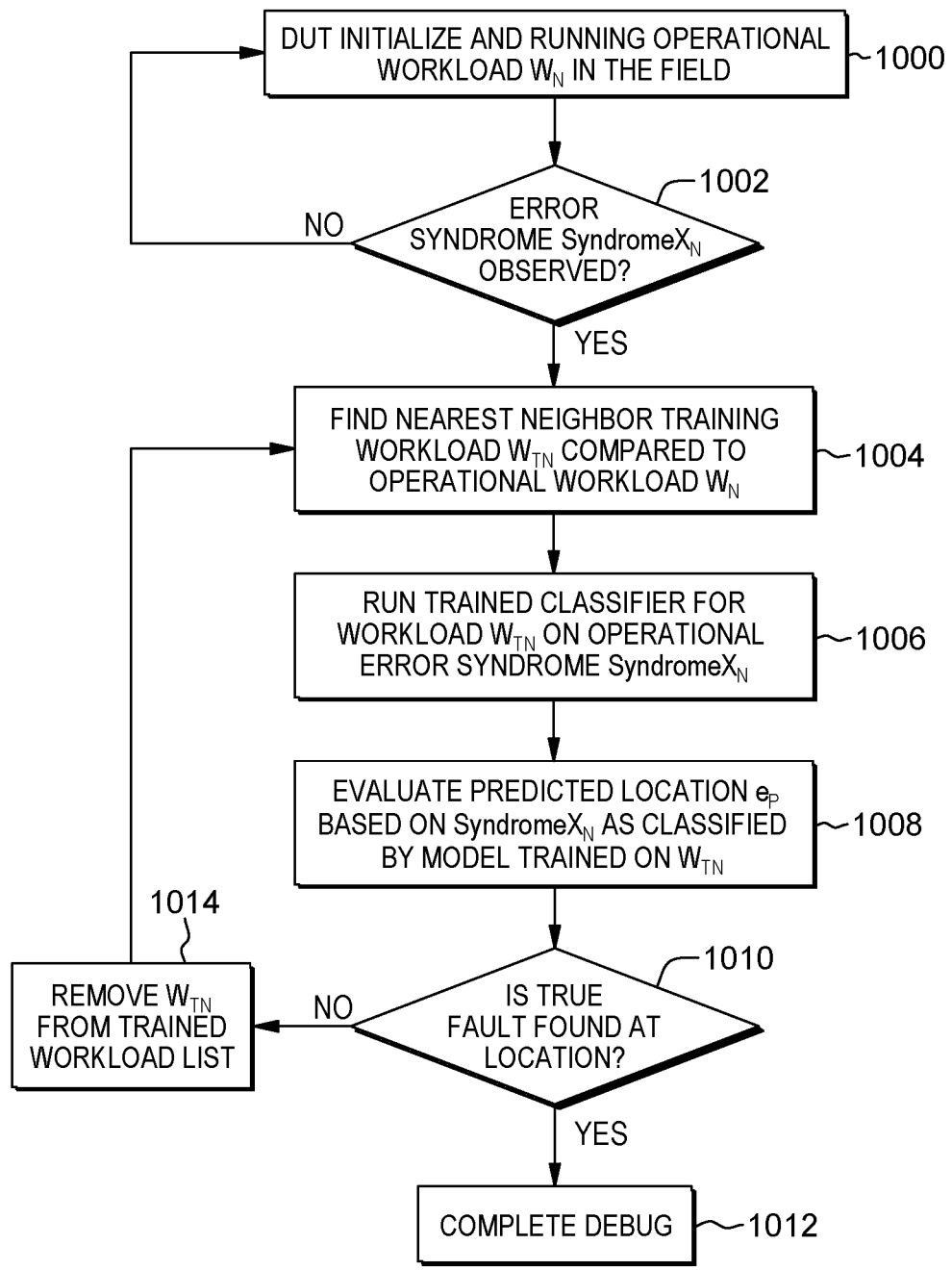
FIG. 10 depicts one embodiment of an inference process using a system debug facility, in accordance with one or more aspects of present disclosure.

FIG. 10 depicts one embodiment of a production environment inference process using a machine learning model trained, for instance, via the system debug facility process embodiment of FIG. 9. As illustrated, in one or more embodiments, the device (or system) under test is initialized and runs with an operational or production workload $W_N$ in the field 1000. The process monitors for an error syndrome SyndromeX$_N$ 1002, and if none is observed, then the system continues to run the operational workload. Once an error syndrome is observed running the operational workload, the process finds, in one embodiment, the nearest neighbor training workload $W_{TN}$ compared to the operational workload $W_N$ 1004, and runs the trained machine learning model (or classifier) for workload $W_{TN}$ on the operational error syndrome SyndromeX$_N$ 1006.

In one or more embodiments, the inference process includes evaluating the predicted location ep based on SyndromeX$_N$ as classified by the model trained on workload $W_{TN}$ 1008, and determines whether a true fault (or error) is found at the predicted location 1010. If "no", then the workload $W_{TN}$ is removed from the trained workload list of the machine learning model 1014, and the process repeats for the next nearest neighbor training workload $W_{TN}$. Assuming that there is a fault found at the predicted location, then the debug process is complete 1012, in one embodiment.

Those skilled in the art will note from the description provided that, in one or more embodiments, a simulation-based model is initialized, and faults or errors are injected into the model along or across paths (such as critical paths) in the system, such as a hardware system, device, chip, hardware unit, etc. The resultant error syndromes are collected from the model and used to create a data set or table to train and test a machine learning (ML) model. The ML model is then deployed operationally in the field, and used to gather potential source paths and/or points where a fault or error originated from, which can significantly narrow down the area for debugging the system. Also, any debugged errors in the field, and the corresponding error syndromes and locations can be used to further improve accuracy of the machine learning model, as described herein. An advantage of the process is the use of simulation-based data to identify potential paths or points where a fault could have originated in the system, and then apply this data set to training the machine learning model. The trained machine learning model(s) disclosed herein significantly reduces the amount of time to debug errors in the operational system, and also, there is no need to simulate every possible fault scenario to effectively narrow down the search for the fault location. Note, in this regard, that the fault can be a hardware based fault or a software based fault, and injecting a fault or error at a location can be, for instance, flipping one or more workload bits at the selected location. The resultant trained machine learning model is evaluated with real world data set with errors occurring randomly across the different blocks or sub-blocks of the system.

As noted, in one or more embodiments, the system can be an integrated circuit or integrated circuit chip, such as a large scale integrated circuit or a very large scale integrated circuit. Advantageously, a more efficient approach to test coverage is provided by injecting faults or errors into the system at the most sensitive locations (critical paths) in a highly selective manner, that is, for the deterministic or semi-deterministic or exhaustive approaches described. Advantageously, in one or more embodiments, simulation based data is used to train the machine learning model to predict an area or path where a fault occurs. Further, the ability to inject targeted faults or errors into the most critical paths of the system (or circuit) based on prior product knowledge significantly reduces the number of test cases needed to train the machine learning model. The goal with the machine learning model is not simply to find the desired fault, but also to predict the most likely origin points of fail in custom environments, thus speeding up the debug process when a fail is encountered in the field. In the processes described herein, the machine learning model not only detects faults, but also constantly learns from detected faults to strengthen the hardware system solution. Also, the process described not only injects known errors into the system, but also advantageously maps the error paths in hardware solutions for making improvements to the hardware.

Advantageously, disclosed herein are a system and method for generating training and test data to facilitate training and testing a machine learning model for system debugging. In one or more embodiments, the process includes acquiring a base data set by injecting faults or errors with minimally adequate coverage into a system level model of a system (e.g., processor, chip, etc.) using a particular workload, and recording the error syndrome (e.g., error codes) generated by the system simulation. The machine learning model is then trained to predict, for instance, error locations based on the recorded error syndromes (for instance, using a traditional data train and test split, feature extraction, confusion matrix, F-score, and/or other machine learning techniques, such as described herein). The base data set for training the machine learning model can be generated according to an approach selected from the group consisting of deterministic training data generation, semi-deterministic training data generation, randomized training set generation, and exhausting training set generation.

In one or more embodiments, deterministic training data generation includes receiving (e.g., from one or more verification experts) critical paths where faults most often occur, and injecting faults at selected locations along those critical paths. Further, the process includes identifying an error syndrome (or failing syndrome) and corresponding path data for training the machine learning model. In the semi-deterministic training data generation approach, the process can include receiving (e.g., from one or more verification experts) critical path identification where faults are most likely to occur, and injecting test faults in those identified paths. In addition, the process includes injecting random errors to generate inject path syndrome sets to be added to the machine learning model. The failing path and error syndrome data is collected for training the machine learning model. In the randomized training set generation process, a netlist of hierarchical nodes across the system under test can be obtained, and a randomized subset of the nodes for error injection can be selected. The randomized subset of nodes for error injection is screened, including against the netlist hierarchy. Responsive to determining that a sub-block is inadequately covered, a new randomized subset of nodes is selected for error injection. In the exhaustive training set generation process, a netlist of hierarchal nodes across the system under test is obtain, and for a given sub-block, errors are sequentially injected into every node in the sub-block.

In one or more embodiments, a further step includes fabricating a physical integrated circuit, such as described herein, in accordance with the VLSI design. One non-limiting specific example that accomplishes this is described herein in connection with FIGS. 11-13. For example, a circuit design structure, based on the VLSI design, is provided to fabrication equipment to facilitate fabrication of a physical integrated circuit in accordance with the design structure.

In one or more embodiments, a layout is prepared based on the analysis. In one or more embodiments, the layout is instantiated as a design structure. In one or more embodiments, a physical integrated circuit is fabricated in accordance with the design structure.

Figure 11:
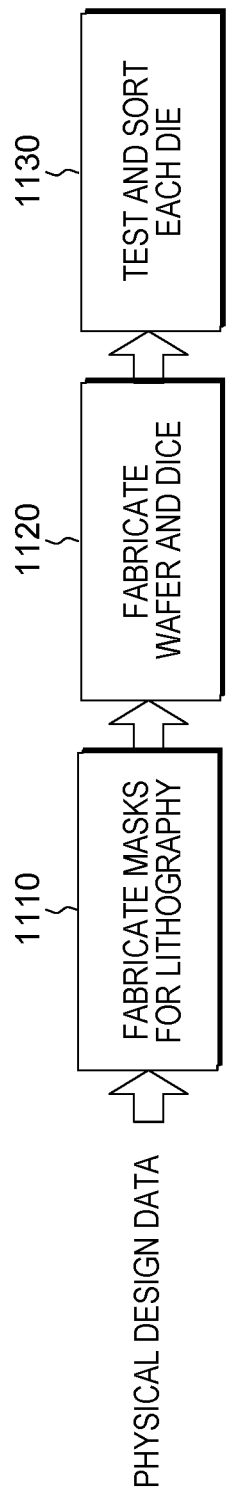
FIG. 11 is a flow diagram of a design process used in semiconductor design, manufacture, and test, in accordance with one or more aspects of present disclosure.

As noted, in one or more embodiments, the layout is instantiated as a design structure. A physical integrated circuit is then fabricated in accordance with the design structure. Refer also to discussion for FIGS. 11-13. FIG. 11 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 11. Generally, a wafer with multiple copies of the final design is fabricated and cut (i.e., diced) such that each die is one copy of the integrated circuit. At block 1110, the processes include fabricating masks for lithography based on the finalized physical layout. At block 1120, fabricating the wafer includes using the masks to perform photolithography and etching. Once the wafer is diced, testing and sorting each die is performed at 1130 to filter out any faulty die. Furthermore, referring to FIGS. 11-13, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper fault detection and correction) compared potentially to circuits designed using prior techniques, including prior debug techniques.

Figure 12:
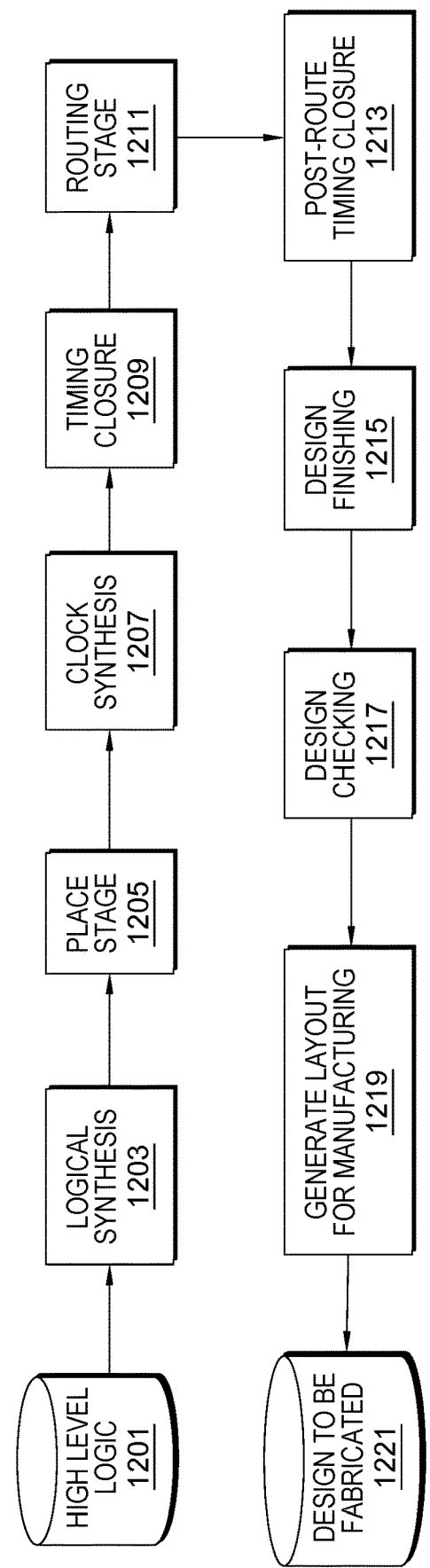
FIG. 12 depicts a further example of integrated circuit fabrication, including generating physical design data, in accordance with one or more aspects of present disclosure.

FIG. 12 depicts an example high-level Electronic Design Automation (EDA) tool flow, which is responsible for creating an optimized microprocessor (or other IC) design to be manufactured. A designer can start with a high-level logic description 1201 of the circuit (e.g. VHDL or Verilog). The logic synthesis tool 1203 compiles the logic and optimizes it without any sense of its physical representation, and with estimated timing information. Placement tool 1205 takes the logical description and places each component, looking to minimize congestion in each area of the design. The clock synthesis tool 1207 optimizes the clock tree network by cloning/balancing/buffering the latches or registers. The timing closure step 1209 performs a number of optimizations on the design, including buffering, wire tuning, and circuit repowering; its goal is to produce a design which is routable, without timing violations, and without excess power consumption. Routing stage 1211 takes the placed/optimized design and determines how to create wires to connect the components, without causing manufacturing violations. Post-route timing closure 1213 performs another set of optimizations to resolve any violations that are remaining after the routing. Design finishing 1215 then adds extra metal shapes to the netlist, to conform with manufacturing requirements. Checking steps 1217 analyze whether the design is violating any requirements such as manufacturing, timing, power, electromigration or noise. When the design is clean, the final step 1219 is to generate a layout for the design, representing all the shapes to be fabricated in the design to be fabricated 1221.

Figure 13:
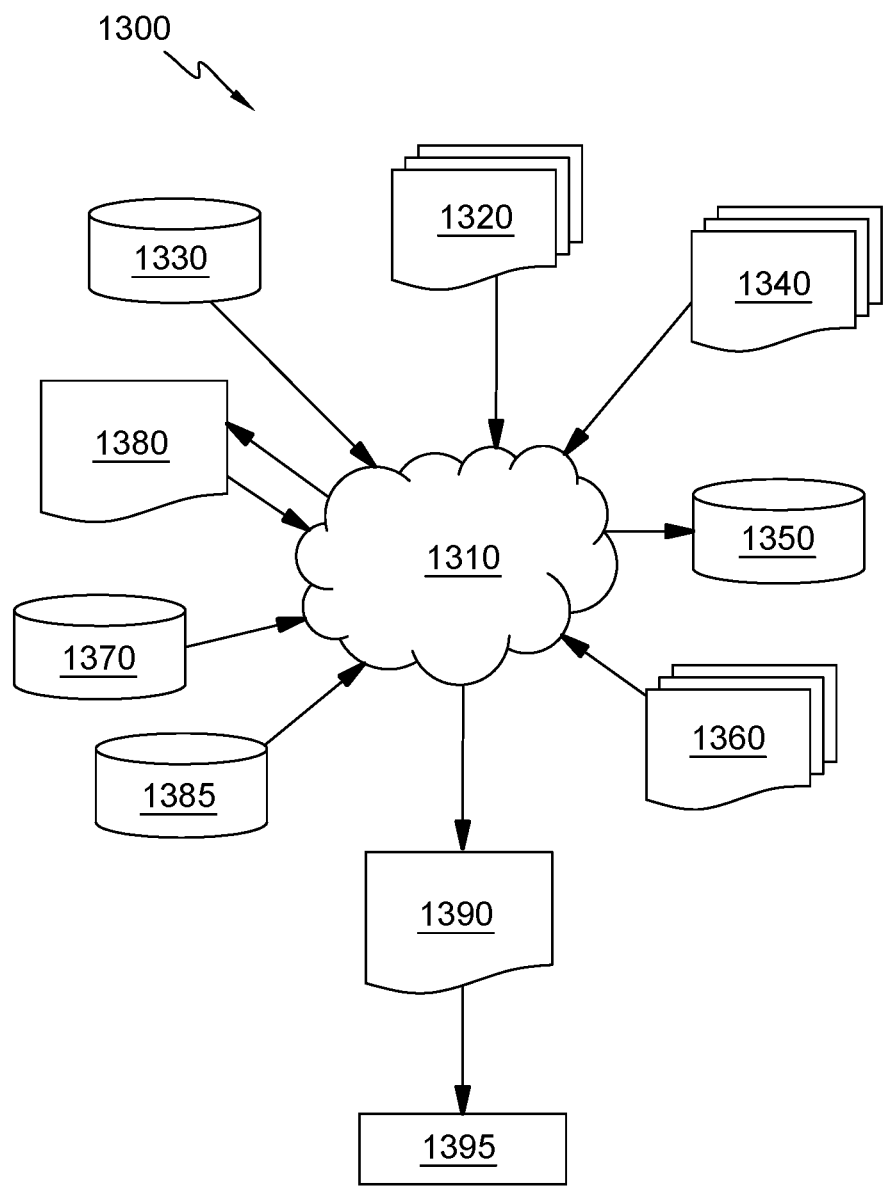
FIG. 13 shows an exemplary high level electronic design automation (EDA) tool flow, through which aspects of present disclosure can be implemented.

One or more embodiments integrate the timing analysis techniques herein with semiconductor integrated circuit design simulation, test, layout, and/or manufacture. In this regard, FIG. 13 shows a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 1300 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., E-V writers), computers, or equipment for simulating design structures, any apparatus used in the manufacturing or test process, or any machines for programming functionality equivalent representations of the design structures into any medium (e.g., a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA).

FIG. 13 illustrates multiple such design structures 1320 that is preferably processed by a design process 1310. Design structure 1320 may be a logical simulation design structure generated and processed by design process 1310 to product a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD), such as implemented by a core developer/designer. When encoded on a gate array or storage medium of the loke, design structure 1320 may be accessed and processed by one or more hardware and/or software modules within design process 1310 to simulate or otherwise functionally represent an electronic component, circuit, electronic or logic module, apparatus, device, or system. As such, design structure 1320 may comprise files or other data structures including human and/or machine-readable source code, compiled structures, and computer executable code structure that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages, such as Verilog and VHDL, and/or higher level design languages, such as C or C++.

Design process 1310 preferably employs and incorporates hardware and/or software modules for synthesizing, translating, or otherwise processing a design/simulation functional equivalent of components, circuits, devices, or logic structures to generate a Netlist 1380, which may contain design structures such as design structure 1320. Netlist 1380 may comprise, for example, compiled or otherwise processed data structures representing a list of wires, discrete components, logic gates, control circuits, I/O devices, modules, etc., that describes the connections to other elements and circuits in an integrated circuit design. Netlist 1380 may be recorded on a machine-readable data storage medium or programmed into a programmable gate array, a compact flash, or other flash memory. Additionally, or in the alternative, the medium may be a system or cache memory, buffer space, or other suitable memory.

Design process 1310 may include hardware and software modules for processing a variety of input data structure system, including Netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385, which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the disclosure. Design process 1310 may also include modules for performing standard circuit design processes such as timing analysis, verification, design rule checking, place and route operations, etc. Improved placement can be performed as described herein.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1320, design structure 1390 preferably comprises one or 10 more files, data structures, or other computer-encoded data or instructions that reside on data storage media and that when processed by an ECAD system generate a logically or otherwise functionally equivalent form of one or more IC designs or the like. In one embodiment, design structure 1390 may comprise a compiled, executable HDL simulation model that functionally simulates the devices to be analyzed.

Design structure 1390 may also employ a data format used for the exchange of layout data of integrated circuits, and/or symbolic data format (e.g. information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1390 may then proceed to a stage 1395 where, for example, design structure 1390: proceeds to tape-out, is released to manufacturing, is released to a mask house, is sent to another design house, is sent back to the customer, etc.

The computing environments described herein are only examples of computing environments that can be used. One or more aspects of the present disclosure may be used with many types of environments. The computing environments provided herein are only examples. Each computing environment is capable of being configured to include one or more aspects of the present disclosure.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other memory access instructions may be used. Further, other predictors may be used, including, but not limited to, other examples of a counter table and/or a global counter. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   generating a data set for training a machine learning model to predict fault location in a system, the generating including:
   injecting, at a selected location of the system, a test fault into a simulation of the system using a workload;
   recording a respective error syndrome generated by the simulation resulting from injecting the test fault into the simulation at the selected location;

repeating injecting, at one or more other selected locations of the system, of one or more other test faults into the simulation of the system using the workload, and the recording of respective error syndromes generated by the simulation resulting from injecting the one or more other test faults into the simulation of the system to generate the data set; and training, using the data set, the machine learning model to predict fault location within the system; and providing the trained machine learning model for use in debugging the system, where the debugging includes predicting, using the trained machine learning model, the fault location within the system based on an error syndrome generated by the system due to the fault.

2. The computer-implemented method of claim 1, wherein generating the data set further comprises generating, for the workload, a table of test faults injected into the simulation of the system, along with respective potential paths of error propagation within the system and respective recorded error syndromes.

3. The computer-implemented method of claim 2, wherein test faults injected into the system include one or more test faults indicative of a hardware fault.

4. The computer-implemented method of claim 1, wherein generating the training data set further comprises deterministically determining the selected location in the system for injecting the test fault into the simulation of the system, and deterministically determining the one or more other selected locations in the system for injecting the one or more other test faults into the simulation of the system.

5. The computer-implemented method of claim 1, wherein generating the training data set further comprises semi-deterministically determining the selected location in the system for injecting the test fault into the simulation of the system, and semi-deterministically determining the one or more other selected locations in the system for injecting the one or more other test faults into the simulation of the system.

6. The computer-implemented method of claim 1, wherein generating the training data set further comprises randomly selecting the selected location in the system for injecting the test fault into the simulation of the system, and randomly selecting the one or more other selected locations in the system for injecting the one or more other test faults into the simulation of the system.

7. The computer-implemented method of claim 1, wherein generating the training data set further comprises exhausting training data set generation by obtaining a netlist of hierarchal nodes across the system, and for a given sub-block of the system, sequentially injecting test faults into all nodes of the given sub-block of the system, and recording respective error syndromes generated by the simulation resulting from injecting test faults into all nodes of the given sub-block of the system.

8. The computer-implemented method of claim 1, further comprising obtaining a further data set from deploying the machine learning model to localize faults during system test, with a different workload, and refining the machine learning model using the further data set.

9. The computer-implemented method of claim 1, wherein the machine learning model comprises a multi-class classifier to predict fault location within the system using the error syndrome generated by the system due to the fault.

10. A computer program product for facilitating processing within a computing environment, the computer program product comprising:

a set of one or more computer readable storage media; and program instructions, collectively stored in the set of one or more computer readable storage media, for causing at least one processor set to perform computer operations comprising:

generating a data set for training a machine learning model to predict fault location in a system, the generating including:

injecting, at a selected location of the system, a test fault into a simulation of the system using a workload;

recording a respective error syndrome generated by the simulation resulting from injecting the test fault into the simulation at the selected location;

repeating injecting, at one or more other selected locations of the system, of one or more other test faults into the simulation of the system using the workload, and the recording of respective error syndromes generated by the simulation resulting from injecting the one or more other test faults into the simulation of the system to generate the data set; and training, using the data set, the machine learning model to predict fault location within the system; and providing the trained machine learning model for use in debugging the system, where the debugging includes predicting, using the trained machine learning model, the fault location within the system based on an error syndrome generated by the system due to the fault.

11. The computer program product of claim 10, wherein generating the data set further comprises generating, for the workload, a table of test faults injected into the simulation of the system, along with respective potential paths of error propagation within the system and respective recorded error syndromes.

12. The computer program product of claim 11, wherein test faults injected into the system include one or more test faults indicative of a hardware fault.

13. The computer program product of claim 10, wherein generating the training data set further comprises deterministically determining the selected location in the system for injecting the test fault into the simulation of the system, and deterministically determining the one or more other selected locations in the system for injecting the one or more other test faults into the simulation of the system.

14. The computer program product of claim 10, wherein generating the training data set further comprises semi-deterministically determining the selected location in the system for injecting the test fault into the simulation of the system, and semi-deterministically determining the one or more other selected locations in the system for injecting the one or more other test faults into the simulation of the system.

15. The computer program product of claim 10, wherein generating the training data set further comprises randomly selecting the selected location in the system for injecting the test fault into the simulation of the system, and randomly selecting the one or more other selected locations in the system for injecting the one or more other test faults into the simulation of the system.

16. The computer program product of claim 10, wherein generating the training data set further comprises exhausting training data set generation by obtaining a netlist of hierarchal nodes across the system, and for a given sub-block of the system, sequentially injecting test faults into all nodes of the given sub-block of the system, and recording respective error syndromes generated by the simulation resulting from injecting test faults into all nodes of the given sub-block of the system.

17. A computer system for facilitating processing within a computing environment, the computer system comprising:
   at least one processor set;
   a set of one or more computer readable storage media; and
   program instructions, collectively stored in the set of one or more computer readable storage media, for causing the at least one processor set to perform computer operations comprising:
      generating a data set for training a machine learning model to predict fault location in a system, the generating including:
         injecting, at a selected location of the system, a test fault into a simulation of the system using a workload;
         recording a respective error syndrome generated by the simulation resulting from injecting the test fault into the simulation at the selected location;
         repeating injecting, at one or more other selected locations of the system, of one or more other test faults into the simulation of the system using the workload, and the recording of respective error syndromes generated by the simulation resulting from injecting the one or more other test faults into the simulation of the system to generate the data set; and
      training, using the data set, the machine learning model to predict fault location within the system; and
      providing the trained machine learning model for use in debugging the system, where the debugging includes predicting, using the trained machine learning model, the fault location within the system based on an error syndrome generated by the system due to the fault.

18. The computer system of claim 17, wherein generating the data set further comprises generating, for the workload, a table of test faults injected into the simulation of the system, along with respective potential paths of error propagation within the system and respective recorded error syndromes.

19. The computer system of claim 18, wherein test faults injected into the system include one or more test faults indicative of a hardware fault.

20. The computer system of claim 17, further comprising obtaining a further data set from deploying the machine learning model to localize faults during system test, with a different workload, and refining the machine learning model using the further data set.

* * * * *